United States Patent
McKinlay

Patent Number: 5,688,091
Date of Patent: Nov. 18, 1997

[54] SELF-LOCKING FASTENER WITH CAPTIVE WASHER

[75] Inventor: Alistair N. McKinlay, Marina Del Rey, Calif.

[73] Assignee: Hong-Kong Disc Lock Company, Ltd., Wanchai, Hong Kong

[21] Appl. No.: 640,320

[22] Filed: Apr. 30, 1996

Related U.S. Application Data

[63] Continuation-in-part of Ser. No. 528,857, Sep. 15, 1995.

[51] Int. Cl.⁶ .................................................. F16B 39/02
[52] U.S. Cl. ................... 411/149; 411/136; 411/533
[58] Field of Search ...................... 411/149, 150, 411/136, 432, 533

[56] References Cited

U.S. PATENT DOCUMENTS

| | | | |
|---|---|---|---|
| 4,571,133 | 2/1986 | Cindow | 411/150 |
| 4,702,657 | 10/1987 | Jelinek | 411/533 |
| 5,080,545 | 1/1992 | McKinlay | 411/149 |
| 5,090,855 | 2/1992 | Terry | 411/149 |
| 5,190,423 | 3/1993 | Ewing | 411/149 |
| 5,203,656 | 4/1993 | McKinlay | 411/149 |

FOREIGN PATENT DOCUMENTS 0350711  9/1992  European Pat. Off. ........ F16B 30/00

*Primary Examiner*—Rodney M. Lindsey
*Assistant Examiner*—Frederick Conley
*Attorney, Agent, or Firm*—Charles W. Chandler

[57] ABSTRACT

This invention relates to a wedge-locking fastener assembly in which a washer is connected to flanged nut by a series of tabs that extend around the outer edge of the flange on a nut.

5 Claims, 3 Drawing Sheets

SELF-LOCKING FASTENER WITH CAPTIVE WASHER

CROSS REFERENCE TO RELATED APPLICATION

This application is a continuation-in-part of my co-pending application Ser. No. 08/528,857 filed Sep. 15, 1995 for "Wedge-Locking Fastener Assembly with a Cammed Flange".

BACKGROUND OF THE INVENTION

Self-tightening fastener assemblies having cammed wedge locking surfaces are known in the art. The fastener assembly described in this application includes a nut and a washer having confronting cammed faces. It is desirable to captively retain the washer on the nut to facilitate fastening the fastener on a workpiece. An example of a retainer may be found in my U.S. Pat. No. 5,203,656 which was issued Apr. 20, 1993 for "Self Centering Self Tightening Fastener", to Alistair N. McKinlay, and uses an annular retainer that is a separate component with respect to the nut and the washer. Another nut having a captively-retained washer is disclosed in European Patent Specification No. 0350711, filed Jun. 27, 1989 for "Locking Device for Threaded Fastener" in which the nut has a flared section that is received inside the washer opening.

Another variation of this product is illustrated in my co-pending patent application in which the nut has an internal flared section that is received inside the center opening of a complementary washer.

SUMMARY OF THE INVENTION

The broad purpose of the present invention is to provide an improved wedge locking fastener having a captively retained washer. In the preferred embodiment of the invention, a cup-shaped washer has an integral annular cylindrical skirt that extends around the outer edge of the flange. Tabs extend radially inwardly from the periphery of the skirt around the flange of the nut. The arrangement is such that the washer can move axially as well as rotatably with respect to the nut to permit the wedge-locking cams to wedge the nut between the cams on the washer and the threads on the bolt. When the nut is turned in a tightening direction, it tightens the washer on the workpiece. When the nut tends to rotate in the loosening direction, such as in response to vibration, the washer remains fixed, but the nut becomes tighter in the manner described in my prior patents.

Another embodiment of the invention employs a pair of washers. The first washer adjacent the nut has a cam surface engaging the nut and a flat bottom surface. The second washer has a cup-shaped configuration and encloses the first washer with tabs that engage the flange of the nut. This embodiment is easier to manufacture than the other embodiment because it employs a conventional washer that is disclosed in my U.S. Pat. No. 5,080,545 issued Jan. 14, 1992 for "Lock Washer Assembly Having Wedge Lock Action", and which is incorporated herein by reference.

Still further objects and advantages of the invention will become apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
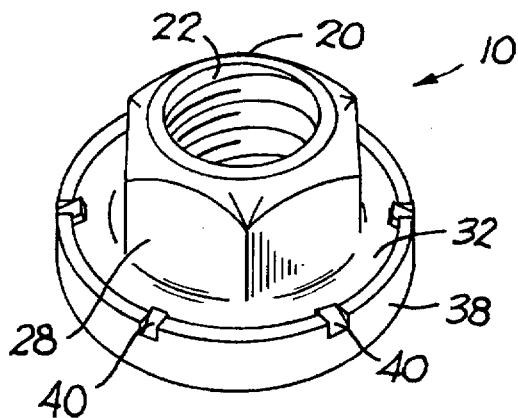
FIG. 1 is a perspective view of a nut with a captive cup-shaped washer illustrating the preferred embodiment of the invention.
Figure 2:
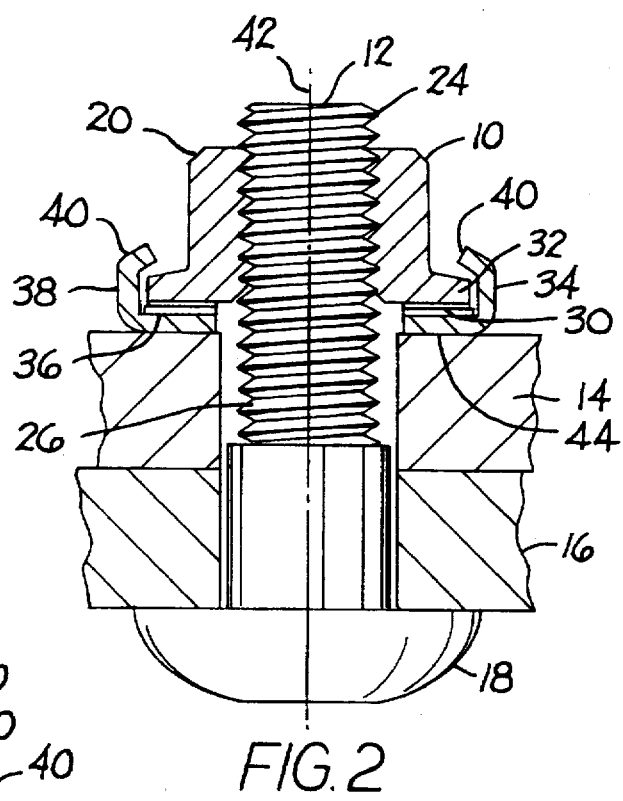
FIG. 2 is a sectional view taken through a fastener assembly constructed according to the invention for securing two workpieces together.
Figure 3:
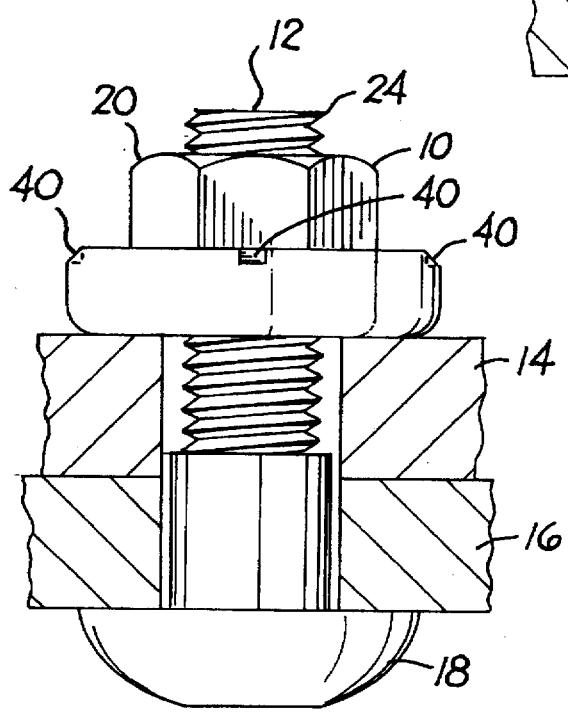
FIG. 3 is a view taken in the same direction as FIG. 2, but showing the nut and washer combination in side elevation.

FIG. 1 shows a fastener assembly 10 illustrating the preferred embodiment of the invention. FIGS. 2 and 3 show fastener assembly 10 mounted on a steel bolt 12 having a threaded shank extending through two workpieces 14 and 16. The bolt has a conventional button-shaped head 18 to prevent the head from being gripped by a wrench or pliers. A steel nut 20 has an internal threaded surface 22 meshed with a continuous helical thread 24 on bolt shank 26. The nut is fastened on the bolt by a wrench, not shown, engaging a multi-sided head 28. Preferably head 28 has six flat sided surfaces arranged in the conventional hexagonal configuration.

The nut has an end camming face 30 forged with an integral annular flange 32. Flange 32 has a diameter larger than the maximum diameter of the nut head. Consequently, the circular bottom face of the flange has a substantially larger surface area than the hexagonal cross section of the nut head.

A steel, non-flexing washer 34 is captively mounted on the nut. The washer has a generally planar lower face 36 connected to an integral annular skirt 38 which extends toward the nut and around flange 32. The upper edge of the skirt has a plurality of retaining tabs 40 that are bent radially inwardly toward the nut head and above the top of the flange as illustrated in FIG. 2. The tabs are equi-angularly spaced and permit the nut flange to rotate within the washer skirt, and permit a sufficient axial motion with respect to the washer so the camming faces on the nut and the washer can slide to provide the wedge-locking action.

Figure 4:
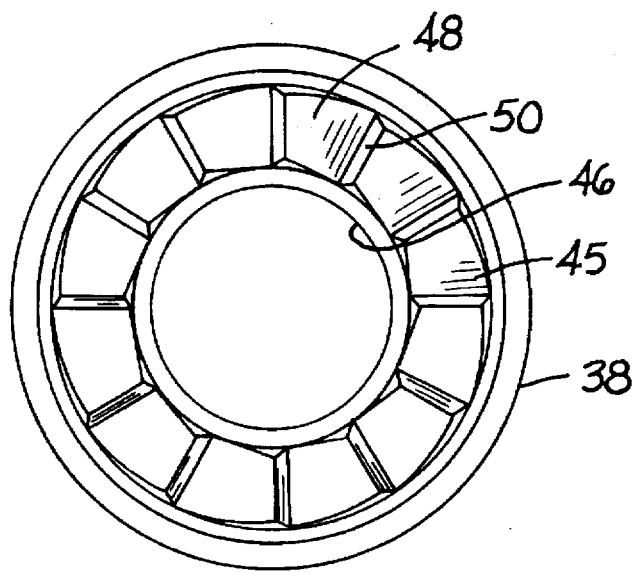
FIG. 4 is an enlarged view of the interior of the washer to show the camming faces.

The work-engaging face of washer at 44 is flat and devoid of any obstruction, so that it can slide on the workpiece. The inside surface of the washer has a camming face 45 as best shown in FIG. 4. The washer also has a central non-threaded opening 46 for receiving the threaded bolt shank. Both nut camming face 30 and washer camming face 45 each have twelve camming structures. Each camming structure comprises a ramp 48 and a shoulder 50. The ramps and shoulders are identical, however, arranged in such a manner that when the nut is turned in a turning direction, the shoulders on the nut push the shoulders on the washer as the nut becomes tightened with the washer on the bolt.

Figure 5:
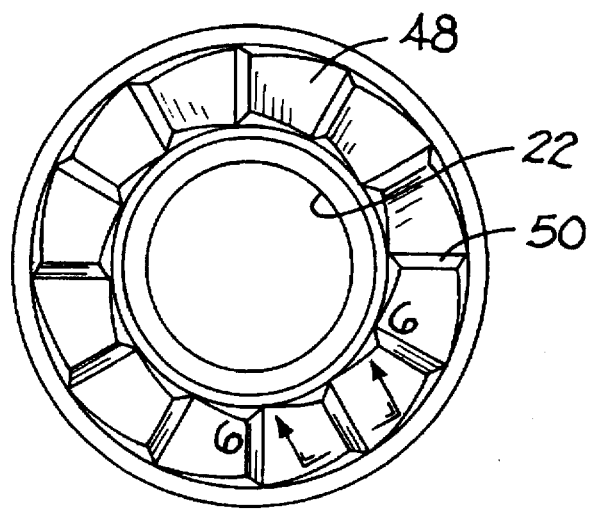
FIG. 5 is an enlarged bottom view of the bottom of the nut to show the camming faces.
Figure 6:
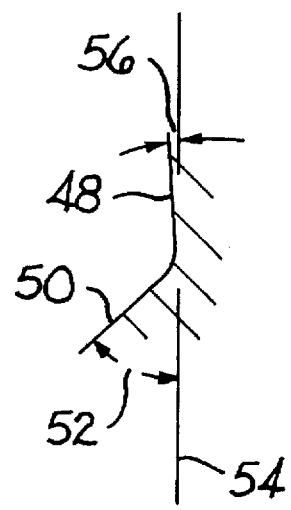
FIG. 6 is an enlarged view of a section of a typical cam profile.

A typical camming ramp and shoulder are illustrated in FIG. 6. The slope angle 52 of the shoulder is about 40°. The term "slope angle" designates the angle that shoulder 50 makes with respect to an imaginary radial plane 54 extending normal to nut turning axis 42. The slope angle 56 of each ramp is about 8°. The shoulders and the ramps of each camming surface are so connected so that each camming face has a continuous uninterrupted undulating contour. The fastener can also function with a single ramp and shoulder on the camming faces of the nut and the washer or a greater number than shown in FIGS. 4 and 5.

Nut 20 is threaded on shank 26 of the bolt by rotating the nut in the clockwise direction when viewing the top of the nut. During the nut tightening operation, the bottom flat face of the washer becomes frictionally anchored to the surface of workpiece 14. Further rotation of the nut in the same direction causes the cam shoulders on the nut to push the cam shoulders on the washer until the nut is fully tightened, applying a tensile stress on the bolt shank. When the nut is rotated in the opposite or loosening direction, either by friction or deliberately, the cam ramps on the nut tend to slide up the cam ramps on the washer. The nut thus moves to a wedged, locked position between the washer ramps and the threads on shank 26. The lock action is enhanced by the fact that the axial thickness dimensions of the shoulders is less than the thread pitch distance of the threads on shank 26.

Figure 7:
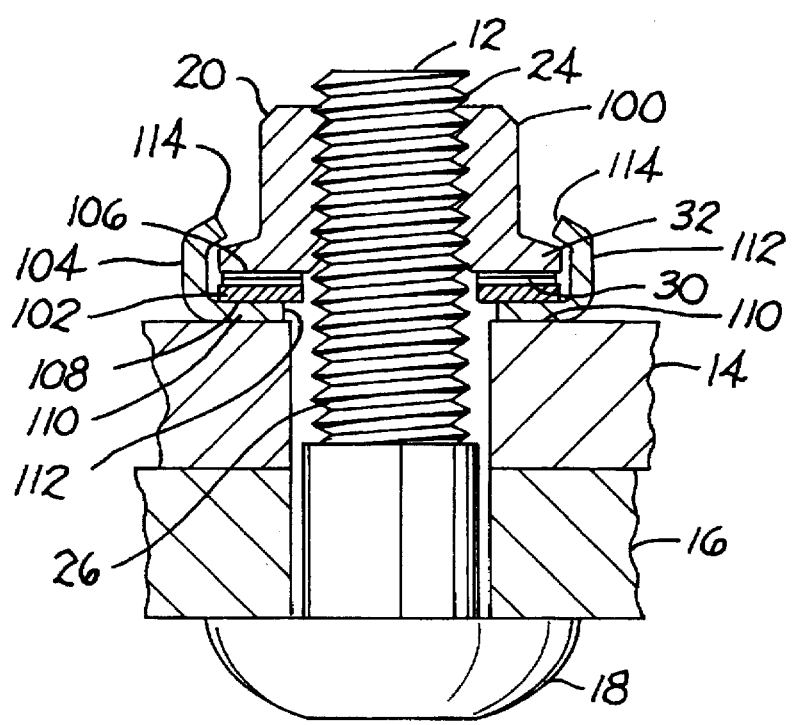
FIG. 7 illustrates another embodiment of the invention in which the cup-shaped washer and the internal washer are separate components.

FIG. 7 shows another embodiment of the invention in which another self-tightening fastener 100 employs the same nut, bolt and workpiece as is illustrated in the embodiment of FIG. 2. However, this embodiment of the invention employs a relatively flat washer 102 and a cup-shaped washer 104. Flat washer 102 is similar to the washer illustrated in my prior U.S. Pat. No. 5,080,545 including an upper cam face 106 which is generally identical to the inside face of the cup-shaped washer of FIG. 1. Cam face 106 is engageable and complementary with the camming face 30 of the flanged nut. Bottom surface 108 of the washer is flat. The washer also has an inner opening 110 which is aligned with the central threaded opening of the nut.

Cup-shaped washer 104 is substantially identical to the cup-shaped washer of FIG. 1 including a flat work-engaging surface 110 and a central opening 112 aligned with the central opening of flat washer 102. Cup-shaped washer 104 has a cylindrical periphery 112 which encloses the flat washer, and extends upwardly. The upper edge of periphery 112 has a plurality of equi-angularly spaced retaining tab means 114 which wrap around the flange of the nut. Periphery 112 of the cup-shaped washer locks the edge of the flat washer while tab means 114 permit the cup-shaped washer to rotate on the bolt shank and to move axially along the bolt to provide the wedge-locking action. The embodiment of FIG. 7 is similar to the embodiment of FIG. 2 except that the cam means on the washer are on a separate washer instead of being integrally formed with the cup-shaped washer. The tightening and loosening functions are the same as the embodiment of FIG. 2.

Having described my invention, I claim:

1. A self-tightening fastener installable on the threaded shank of a cooperating fastener member (12), comprising:

a nut comprising a one piece body that includes a head and an integral flange;

a threaded opening extending through said head and said flange on a central axis;

said head having a non-circular side surface engageable with a turning tool for rotating the nut around the central axis;

said flange having a peripheral edge spaced a greater distance from the central axis than said non-circular side surface;

a washer that includes a flat radial wall axially aligned with said flange, a continuous annular skirt extending axially from said radial wall beyond said flange, and plural tabs extending inwardly from said skirt to overly said flange and prevent the nut from separating from the washer;

means forming a first annular cam lock surface on the nut body, and means forming a second cooperating annular cam lock surface on the radial wall of the washer;

said tabs having an axial clearance relative to said flange, whereby said first cam lock surface can ratchet on said second cam lock surface when the nut is tightened to generate a tensile locking stress in the threaded shank.

2. The self-tightening fastener as defined in claim 1, wherein said means forming the second cam lock surface comprises integral undulating surface areas formed on the radial wall of the washer.

3. The self-tightening fastener as defined in claim 1, wherein said means forming the second cam lock surfaces comprises a separate annular disk seated on the radial wall of the washer.

4. The self-tightening fastener as defined in claim 1, wherein said skirt has a relatively small radial clearance with respect to the peripheral edge of said flange, whereby the first and second cam lock surfaces are automatically aligned on a common axis.

5. The self-tightening fastener as defined in claim 1, wherein each tab comprises a portion of the skirt bent inwardly toward said central axis so that each tab is within the axial dimension of the skirt.

* * * * *